United States Patent [19]

Ueda et al.

[11] Patent Number: 4,959,824
[45] Date of Patent: Sep. 25, 1990

[54] OPTICAL INFORMATION RECORD/PICKUP HEAD ASSEMBLY

[75] Inventors: Toshihiko Ueda; Kouitirou Tutiyasu; Kazuyuki Yoshida; Mitsutoshi Yagoto, all of Osaka, Japan

[73] Assignee: Minolta Camera Kabushiki Kaisha, Osaka, Japan

[21] Appl. No.: 226,435

[22] Filed: Jul. 29, 1988

[30] Foreign Application Priority Data

| Jul. 31, 1987 | [JP] | Japan | 62-190379 |
| Jul. 31, 1987 | [JP] | Japan | 62-190380 |
| Jul. 31, 1987 | [JP] | Japan | 62-190381 |
| Aug. 4, 1987 | [JP] | Japan | 62-195537 |

[51] Int. Cl.⁵ .............................. G11B 7/095
[52] U.S. Cl. .................... 369/44.14; 369/112
[58] Field of Search ............ 369/45, 46, 112; 250/201 DF

[56] References Cited

U.S. PATENT DOCUMENTS

| 4,644,516 | 2/1987 | Musha | 369/45 |
| 4,669,073 | 5/1987 | Wakabayashi et al. | 369/45 |
| 4,688,201 | 8/1987 | Towner et al. | 369/45 |
| 4,730,294 | 3/1988 | Funada | 369/46 |
| 4,731,772 | 3/1988 | Lee | 369/46 |
| 4,764,912 | 8/1988 | Ando et al. | 369/46 |
| 4,769,800 | 9/1988 | Moser et al. | 369/45 |
| 4,841,510 | 6/1989 | Yoshizawa | 369/46 |

Primary Examiner—Donald McElheny, Jr.
Attorney, Agent, or Firm—Price, Gess & Ubell

[57] ABSTRACT

An information record/pickup head assembly for an optical information recording and/or reproducing apparatus using an optical information storage disk, comprising a stationary optical unit and a movable optical unit movable with respect to the information storage disk loaded, wherein the stationary optical unit emits a beam of light toward the movable optical unit which then re-directs the incident beam toward the information storage disk while returning to the stationary optical unit the beam of light reflected from the information storage disk. A focusing operation is carried out in the stationary optical unit.

23 Claims, 15 Drawing Sheets

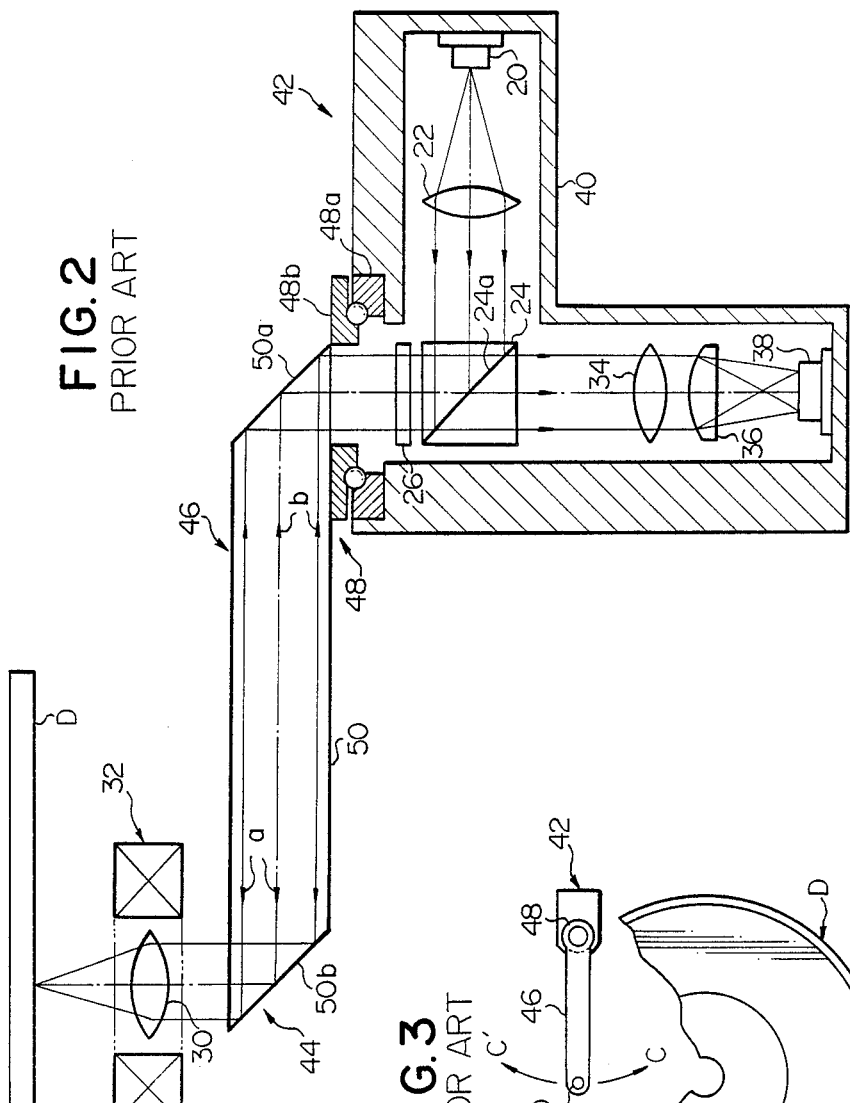
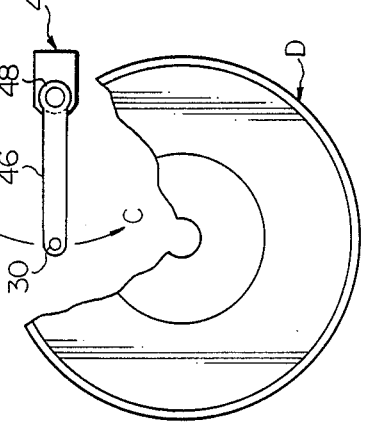

FIG. 10
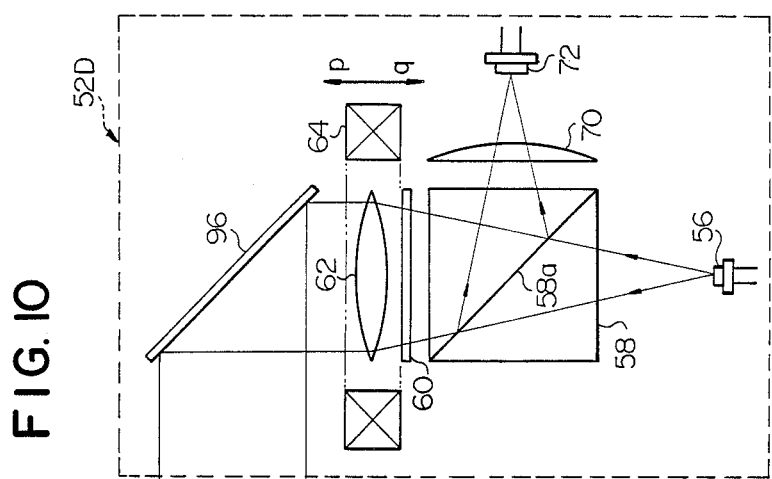
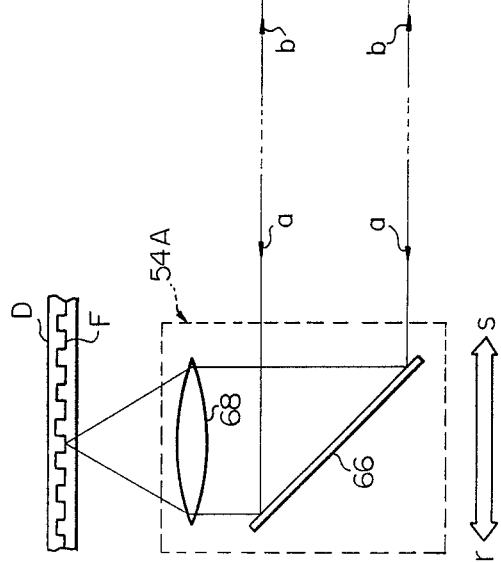

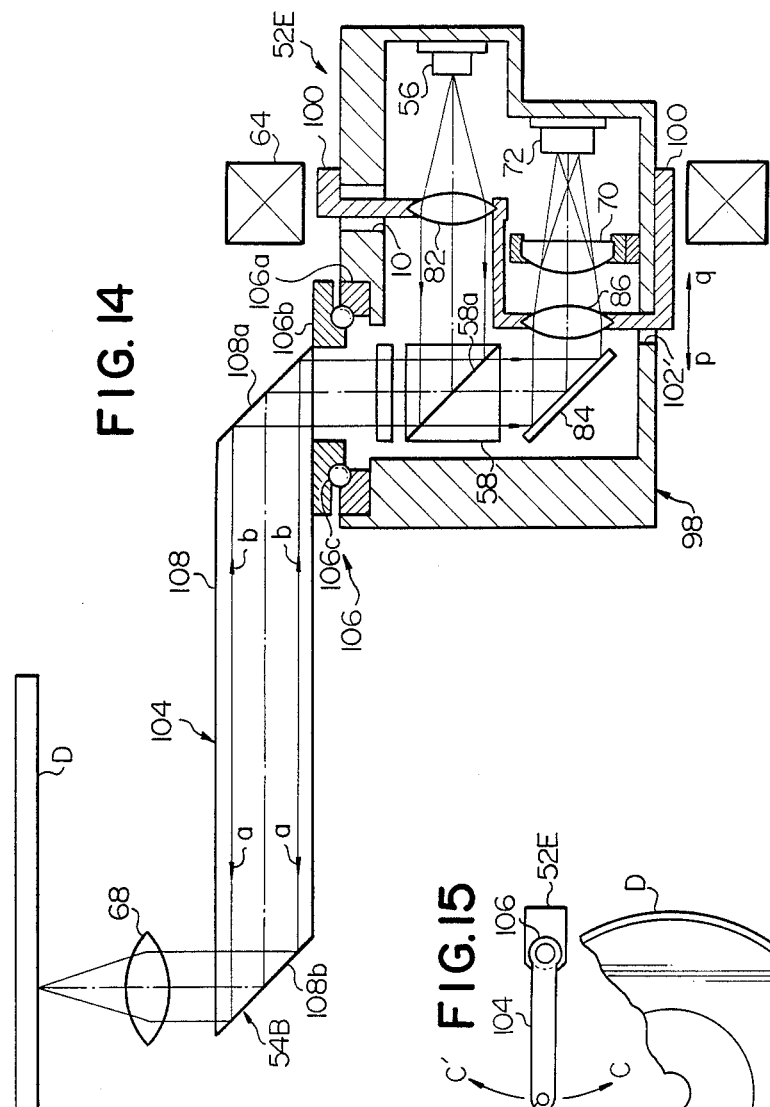
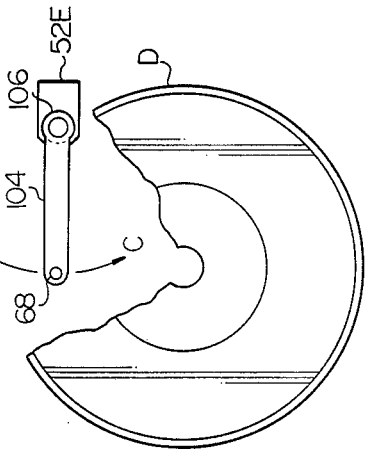

OPTICAL INFORMATION RECORD/PICKUP HEAD ASSEMBLY

FIELD OF THE INVENTION

The present invention relates to an optical information recording and/or reproducing apparatus and, more particularly, to an information record/pickup head assembly for use in an optical information recording and/or reproducing apparatus.

BACKGROUND OF THE INVENTION

An information recording and/or reproducing apparatus apparatus is known which uses an optical information storage disk as a medium for recording and/or reproducing sound and/or image information. An information recording and/or reproducing apparatus using such an information storage medium has various predominant advantages over apparatus using magnetic information recording and/or reproducing media such as floppy disks and hard disks. One of such advantages is the far higher information storage density available of an optical information storage disk. An optical information recording and/or reproducing apparatus is however unsatisfactory in respect of the access time required in reading and/or writing information on the information storage medium. This drawback results principally from the requirement for moving the optical information record/pickup head assembly which consists of a bulky, heavy-weight focusing unit including an object lens, a reflector mirror and a focusing actuator. In the case of a magnetic disk recording and/or reproducing apparatus, a magnetic head which is far smaller in size and lighter in weight is to be driven for movement in reading and/or writing information on the information storage medium.

SUMMARY OF THE INVENTION

In accordance with the present invention, there is provided an optical information record/pickup head assembly for an optical information recording and/or reproducing apparatus using an optical information storage disk, comprising a stationary optical unit which is fixedly disposed within the information record/pickup head assembly and a movable optical unit which is movable with respect to the information storage disk loaded into the recording and/or reproducing apparatus, wherein the stationary optical unit is operative to emit a beam of light toward the movable optical unit which then re-directs the incident beam toward the information storage disk while returning to the stationary optical unit the beam of light reflected from the information storage disk, (A) the stationary optical unit comprising (a) beam emitting means operative to emit a beam of light therefrom, (b) first optical means for collimating the beam of light from the beam emitting means, (c) light sensitive means responsive to the beam of light reflected from the information storage disk and returned through the movable optical unit to the stationary optical unit for obtaining the information picked up from the information storage disk and focus-state information, (d) path-of-light shifting means located in conjunction with the beam emitting means, the first optical means and the light sensitive means for establishing a first path of light along which the beam of light from the beam emitting means is to be directed toward the movable optical unit and a second path of light along which the beam of light returned from the movable optical unit is to be directed toward the light sensitive means, and (e) focus control means responsive to the focus-state information for driving the first optical means for movement along the optical axis of the optical means, and (B) the movable optical unit comprising (f) carrier means carrying the movable optical unit thereon and movable with respect to the information storage disk so that the beam of light received from the stationary optical unit is to be directed at a desired location on the information storage disk, and (g) second optical means fixedly mounted on the carrier means for directing toward and converging on the information storage disk the beam of light received from the stationary optical unit and further directing toward the stationary optical unit the beam of light reflected from the information storage disk.

In an optical information record/pickup head assembly thus constructed and arranged in accordance with the present invention, the movable optical unit may be movable substantially straight radially of the information storage disk or substantially in an arc radially of the information storage disk.

BRIEF DESCRIPTION OF THE DRAWINGS

The drawbacks of a prior-art optical information recording and/or reproducing apparatus and the features and advantages of a recording and/or reproducing apparatus according to the present invention will be more clearly understood from the following description taken in conjunction with the accompanying drawings in which like reference numerals designate similar or corresponding units, members and elements and in which:

FIG. 2 is a schematic side elevation view showing, partly in section, the general optical arrangement of another prior-art information record/pickup head assembly for use in an optical information recording and/or reproducing apparatus of the type to which the present invention generally appertains;

FIG. 3 is a plan view showing, to a reduced scale, the arrangement of the information record/pickup head assembly of FIG. 2 positioned with respect to an optical information storage disk which is shown partially cut away;

FIG. 10 is a schematic side elevation view showing the general optical arrangement of a fourth preferred embodiment of an information record/pickup head assembly for use in an optical information recording and/or reproducing apparatus in accordance with the present invention generally appertains;

FIG. 14 is a schematic side elevation view showing the general optical arrangement of a fifth preferred embodiment of an information record/pickup head assembly for use in an optical information recording and/or reproducing apparatus in accordance with the present invention generally appertains;

FIG. 15 is a plan view showing, to a reduced scale, the arrangement of the information record/pickup head assembly of FIG. 14 positioned with respect to an optical information storage disk which is shown partially cut away;

DESCRIPTION OF THE PRIOR ART

Figure 1:
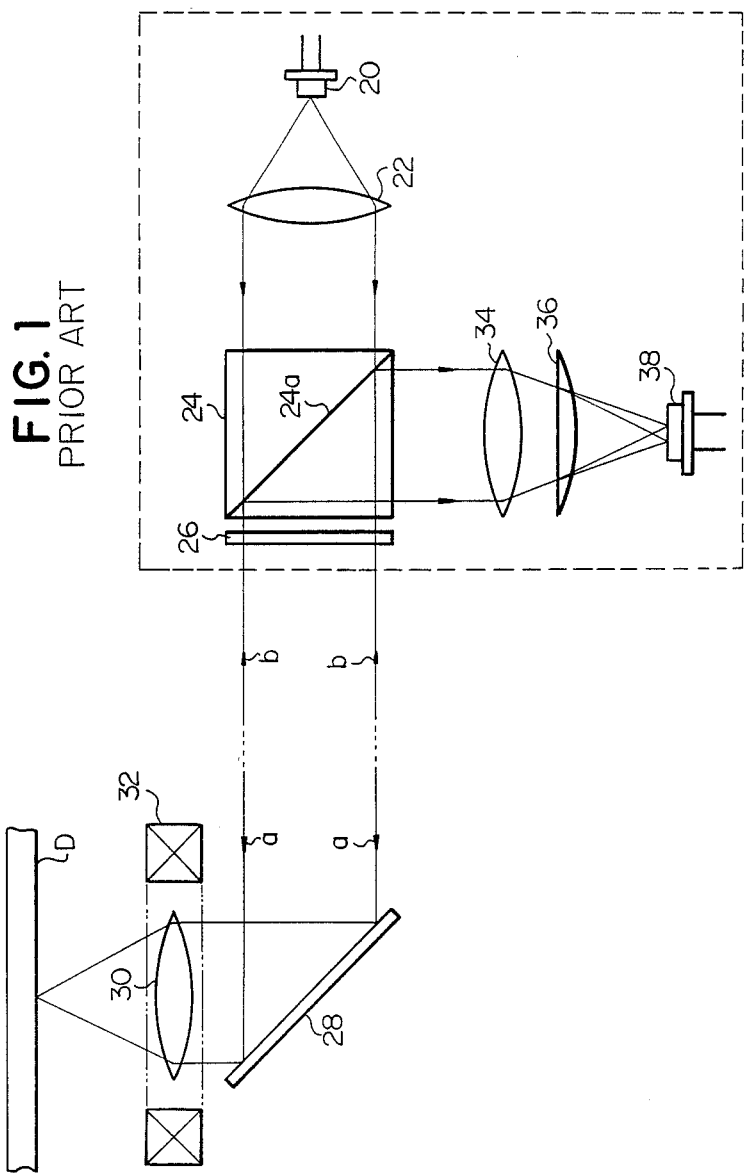
FIG. 1 is a schematic side elevation view showing the general optical arrangement of a prior-art information record/pickup head assembly for use in an optical information recording and/or reproducing apparatus of the type to which the present invention generally appertains.

As pointed out at the outset of this description, an information recording and/or reproducing apparatus using a known optical information record/pickup head assembly is not fully acceptable because the access time in reading and writing information through the head assembly which is inherently bulky and heavy in construction. FIG. 1 of the drawings shows the construction and arrangement of another prior-art optical information record/pickup head assembly which has been proposed to overcome such a drawback of the known information record/pickup head assembly in Japanese Provisional Patent Publication (Kokai) No. 59-215033.

In the prior-art optical information record/pickup head assembly shown in FIG. 1, a linearly polarized laser beam emanating from a laser generator 20 is collimated through a collimator lens 22 and is transmitted and through the junction plane 24a of a beam splitter prism 24. The beam of light transmitted through the beam splitter prism 24 is passed through and circularly polarized by a quarter-wave plate 26 and thence advances in the direction of arrows a toward a deflector mirror 28 having a reflective plane inclined at an angle of 45 degrees to the path of the incoming beam. The beam of light incident on the deflector mirror 28 is deflected at an angle of 90 degrees therefrom and is focussed through a condensing object lens 30 onto an optical information storage disk D to form a spot of light on the information carrying surface of the disk D. The deflector mirror 28 and object lens 30 form part of a movable focusing unit which further includes a focusing actuator 32 by means of which the object lens 30 is to be driven for movement with respect to the information storage disk D so that the beam of light incident on the information storage disk D is correctly focussed at a particular track of information storage pits in the information carrying surface of the information storage disk D.

The beam of light which has reached the information carrying surface of the optical information storage disk D is reflected therefrom and advances backwardly through the lens 30 and deflector mirror 28. The beam of light which has been circularly polarized is then polarized linearly by means of the quarter-wave plate 26 as indicated by arrows b and enters the beam splitter prism 24 for a second time but now in the reverse direction. The linearly polarized beam of light thus admitted into the beam splitter prism 24 is reflected at the beam-deflecting junction plane 24a of the beam splitter prism 24 and is re-directed at an angle of 90 degrees from the path of the incoming beam. The beam of light reflected from the junction plane 24a of the beam splitter prism 24 is then passed through a condenser lens 34 and a semicylindrical focusing lens 36 and is thereby focussed onto a four-segment optoelectric transducer element 38.

The construction and arrangement of still another example of an information recording and/or reproducing apparatus using a known optical information record/pickup head assembly is shown in FIGS. 2 and 3. The information record/pickup head assembly herein shown is disclosed in Japanese Provisional Patent Publication (Kokai) No. 61-54052.

In the prior-art optical information record/pickup head assembly shown in FIGS. 2 and 3, the laser generator 20, collimator lens 22, beam splitter prism 24 and quarter-wave plate 26 are accommodated within a casing 40 and form part of a stationary optical unit 42. This stationary optical unit 42 is provided in combination with a movable optical unit 44 which is operatively coupled to the stationary optical unit 42 by means of a light transmitter element 46. The casing 40 forming part of the stationary optical unit 42 includes a bearing assembly 48 including a fixed race member 48a securely attached to the casing 40 and a rotatable race member 48b rotatably engaged by the fixed race member 48a by means of a series of bearing elements. The bearing assembly 48 is disposed to have a center axis aligned with the optical axis of the beam of light emanating from the beam splitter prism 24 and square-wave plate 26.

The light transmitting element 46 is comprised of an elongated prism 50 which has an end portion fixedly attached to the rotatable race member 48b of the bearing assembly 48. The elongated prism 50 is thus rotatable with respect to the stationary optical unit 42 about the center axis of the bearing assembly 48. The prism 50 has a first reflective surface 50a located at the end of the prism 50 adjacent the bearing assembly 48 and inclined at an angle of 45 degrees to the path of the beam of light from the beam splitter prism 24 and square-wave plate 26 and a second reflective surface 50b located at the opposite end of the prism 50 and parallel with the first reflective surface 50a. The second reflective surface 50b of the prism 50 is equivalent to the deflector mirror 28 in the prior-art head arrangement described with reference to FIG. 1 and forms part of the movable optical unit 44 which thus further includes the condensing object lens 30 and the focusing actuator 32 to drive the lens 30 for movement with respect to the optical information storage disk D.

The beam of light transmitted through the beam splitter prism 24 and quarter-wave plate 26 as in the arrangement described with reference to FIG. 1 enters the light transmitting prism 50 and is reflected at the first reflective surface 50a to advance toward the second reflective surface 50b of the prism 50 as indicated by arrows a. The beam of light is deflected at an angle of 90 degrees from the second reflective surface 50b of the prism 50 and is thence focussed through the condensing object lens 30 onto the information carrying surface of the disk D. The beam of light is then reflected from the information carrying surface of the optical information storage disk D and is re-directed through the lens 30, second and first reflective surfaces 50b and 50a of the prism 50 as indicated by arrows b and, past the quarter-wave plate 26, enters the beam splitter prism 24 for a second time. The polarized beam of light thus admitted into the beam splitter prism 24 is reflected at the beam-deflecting junction plane 24a of the beam splitter prism 24 and advances through the condenser and focusing lenses 34 and 36 also accommodated within the casing 40 and is focussed onto the four-segment optoelectric transducer element 38.

The movable optical unit 44 is thus pivotally connected to the stationary optical unit 42 and is thus rotatable about the center axis of the bearing assembly 48. In the head arrangement hereinbefore described with reference to FIG. 2, focusing means is implemented by the second reflective surface 50b of the prism 50, condenser lens 30 and focusing actuator 32. The movable optical unit 44 including such focusing means is pivotally connected to the stationary optical unit 42 and is thus rotatable about the center axis of the bearing assembly 48. The focusing means provided in the prior-art information record/pickup head assembly herein shown is accordingly movable in an arc either in the direction of arrow c or in the direction of arrow c' with respect to the information storage disk D about the center axis of the bearing assembly 48 as illustrated in FIG. 3.

In the prior-art head arrangement described with reference to FIG. 1, the laser generator 20, collimator lens 22, beam splitter prism 24, quarter-wave plate 26, condenser lens 32 and focusing lens 36 provide in combination a stationary optical unit. This stationary optical unit is contrasted by a movable optical unit including the deflector mirror 28, condenser lens 30 and focusing actuator 32. The movable unit of such a head arrangement is in effect similar to the movable optical unit 44 of the prior-art head arrangement described with reference to FIGS. 2 and 3 although the former is physically separate from the stationary optical unit and the latter is physically coupled to the stationary optical unit 42.

Only a portion of the information record/pickup head assembly is thus movable in each of the hereinbefore described prior-art head arrangements to reduce the size and weight of the focusing unit. Such an attempt is considerably useful for reducing the access time in reading and/or writing information on the information storage disk D but is still unsatisfactory for drastically reducing the access time.

It is, accordingly, an important object of the present invention to provide an improved information record/pickup head assembly adapted to achieve a drastically reduced access time in reading and/or writing information on an optical information storage medium.

It is another important object of the present invention to provide an optical information recording and/or reproducing apparatus including an improved information record/pickup head assembly adapted to achieve a drastically reduced access time in reading and/or writing information on an optical information storage medium.

DESCRIPTION OF THE PREFERRED EMBODIMENTS

First Preferred Embodiment

Figure 4:
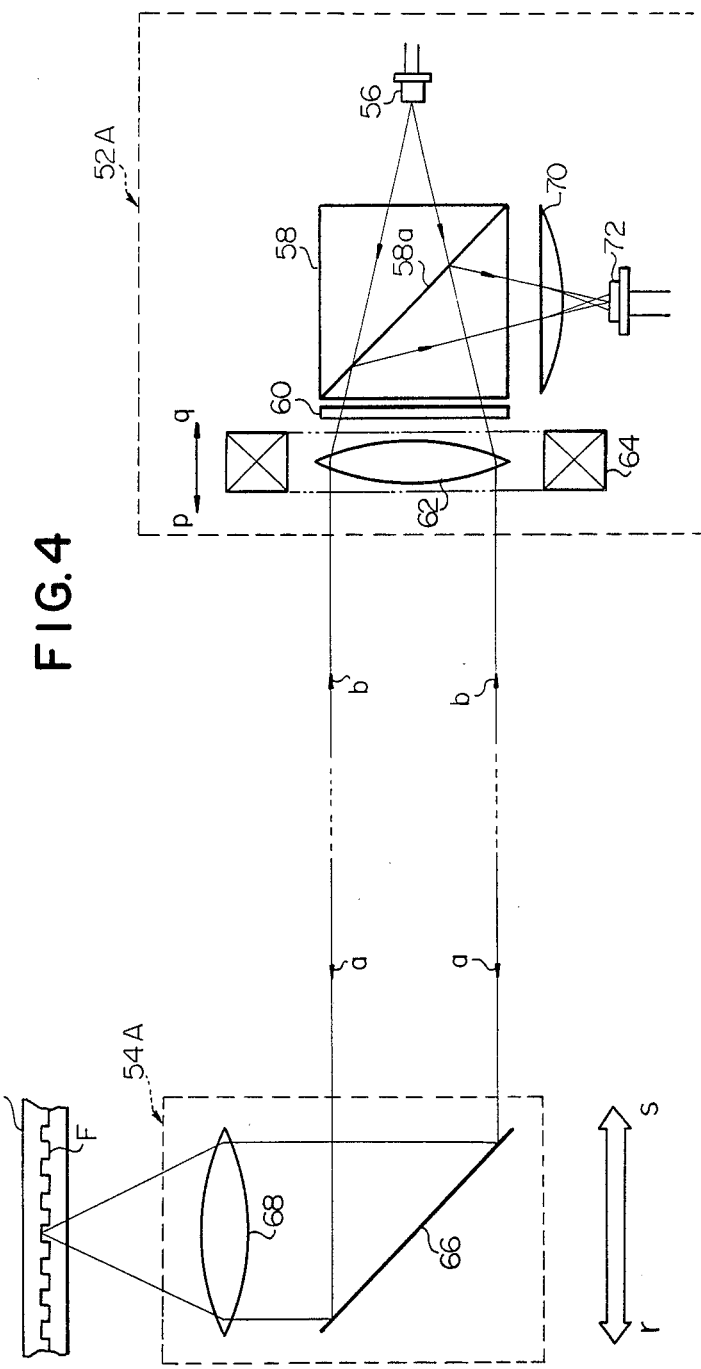
FIG. 4 is a schematic side elevation view showing the general optical arrangement of a first preferred embodiment of an information record/pickup head assembly for use in an optical information recording and/or reproducing apparatus in accordance with the present invention generally appertains.
Figure 5:
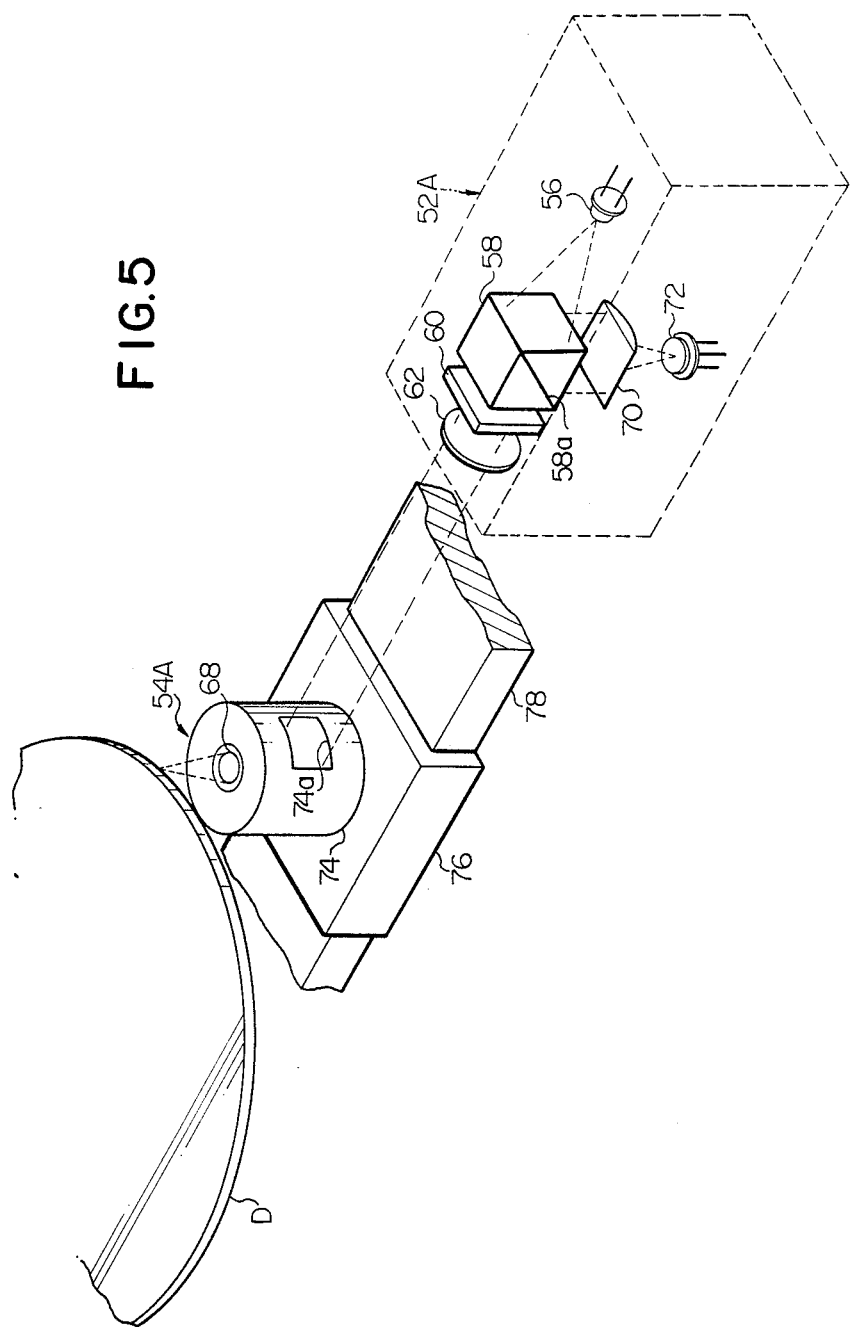
FIG. 5 is a schematic perspective view showing, partially cut away, the optical arrangement of the information record/pickup head assembly illustrated in FIG. 4.
Figure 6:
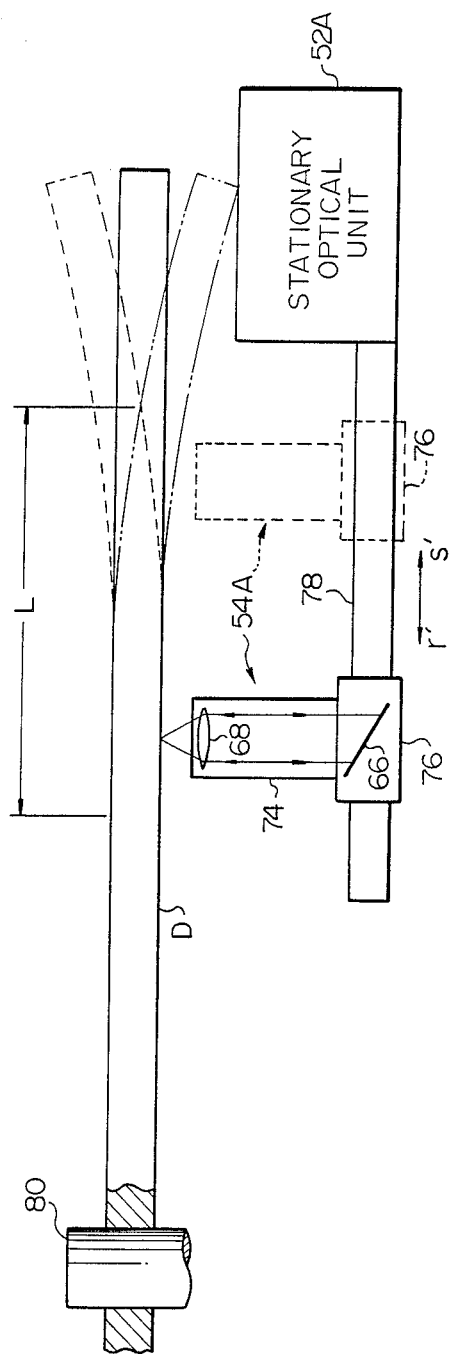
FIG. 6 is a side elevation view showing, to a reduced scale, the arrangement by means of which the stationary and movable optical units forming the information record/pickup head assembly illustrated in FIGS. 4 and 5 are mechanically coupled together with respect to a information storage disk loaded into the recording and/or reproducing apparatus.

A first preferred embodiment of an information record/pickup head assembly according to the present invention will now be described with reference to FIGS. 4 to 7 of the drawings. The information record/pickup head assembly herein shown forms part of an optical information recording and/or reproducing apparatus and largely consists of a stationary optical unit 52A and a movable optical unit 54A as shown in FIGS. 4, 5 and 6. The stationary optical unit 52A is in its entirety fixedly positioned in the information recording and/or reproducing apparatus and the movable optical unit 54A in its entirety is arranged to be movable with respect to the stationary optical unit 52A and accordingly to an optical information storage disk D loaded into the recording and/or reproducing apparatus. As well known in the art, the disk D is an information storage medium on which information is or can be recorded in the form of series of pits which are arranged in spiral or concentrical tracks about the center axis of the disk.

The stationary optical unit 52A comprises a laser generator 56 from which is to be emitted a linearly polarized laser beam. The laser generator 56 used in the information record/pickup head assembly herein shown is assumed to be of the semiconductor activated type although another type of laser generator may also be used. The construction and arrangement of a semiconductor laser generator per se is well known in the art and will not be herein described. At a predetermined distance from the laser generator 56 is disposed a beam splitter prism 58 having a beam-deflecting junction plane 58a inclined at an angle of 45 degrees to the optical axis of the beam of light emanating from the laser generator 56. Immediately posterior to the beam splitter prism 58 is located a square-wave plate 60 to circularly polarize the beam of light emerging out of the beam splitter prism 58.

The stationary optical unit 52A of the information record/pickup head assembly shown in FIGS. 4, 5 and 6 further comprises a collimator lens 62 to collimate the beam of light passed through the quarter-wave plate 60. The collimator lens 62 is movable within the stationary optical unit 52A and is fixedly disposed on a carrier on which is further supported a focusing actuator 64 which is operative to drive the collimator lens 62 for movement along the optical axis of the lens 62 as indicated by arrows p and q. The focusing actuator 64 may be of any desired design and, by way of example, comprises a voice coil assembly having a movable plunger secured to the collimator lens 62 and a driver coil helically surrounding the plunger, though not shown in the drawings.

The linearly polarized laser beam emitted from the laser generator 20 is transmitted through the junction plane 58a of the beam splitter prism 58 and is then circularly polarized through the polarizing plate 60. The beam of light emanating from the polarizing plate 60 is collimated through the collimator lens 62 and thence advances in the direction of arrows a toward the movable optical unit 54A.

The movable optical unit 54A comprises a deflector mirror 66 having a reflective plane inclined at an angle of 45 degrees to the path of the laser beam from the stationary optical unit 52A. The beam of light incident on the deflector mirror 66 is deflected at an angle of 90 degrees therefrom and is focussed through a condensing object lens 68 onto an optical information storage disk D to form a spot of light on the information carrying surface of the disk D. The movable optical unit 54A thus including the deflector mirror 28 and object lens 30 is movable with respect to the information storage disk D in parallel with the information-carrying surface F of the disk D as indicated by arrows r and s. The movable optical unit 54A is driven to move either in the direction of arrow r or in the direction of arrow s radially of the information storage disk D during tracking of the disk D.

The beam of light which has thus reached the information carrying surface F of the optical information storage disk D is reflected therefrom and advances backwardly through the lens 68 and deflector mirror 66 toward the stationary optical unit 52A as indicated by arrows b. The circularly polarized beam of light admitted into the stationary optical unit 52A is passed through the lens 62 which now acts as a condenser lens and is linearly polarized by means of the polarizing plate 64. The linearly polarized beam of light is admitted into the beam splitter prism 58 in the reverse direction has a plane of polarization deviated through an angle of 90 degrees from the plane of polarization of the beam originating in the laser generator 56. Thus, the beam of light admitted backwardly into the beam splitter prism 58 is this time reflected at the deflecting junction plane 58a of the beam splitter prism 58 and is re-directed at an angle of 90 degrees from the path of the incoming beam. The beam of light reflected from the junction plane 58a of the beam splitter prism 58 is then passed through a semicylindrical focusing lens 70 for generating astigmatism and is thereby focussed onto an information detecting light sensitive device typically implemented by a four-segment optoelectric transducer element 72. Though not shown in the drawings, the four-segment optoelectric transducer element 72 is composed of a combination of four photodiodes which consists of a pair of opposite photodiodes connected to one input terminal of a matrix amplifier and a pair of opposite photodiodes connected to the other input terminal of the matrix amplifier. The matrix amplifier is one of a multiplicity of such amplifiers arranged in matrix form and produces an output signal containing focusing and tracking information in addition to the image information read from or recorded on the information carrying surface F of the information storage disk D. From the focusing information is to be detected the focal point of the beam of light incident on the information carrying surface F of the information storage disk D. The tracking information is used to detect the location of the spot of light on the information carrying surface F of the information storage disk D in a radial direction of the disk D.

The focusing lens 70 and optoelectric transducer element 72 also form part of the stationary optical unit 52A. In contrast to the stationary optical unit of the prior-art head arrangements described with reference to FIGS. 1 to 3, the combination of the beam splitter prism 58 and polarizing plate 60 is disposed intermediate between the laser generator 56 and lens 62. The lens 62 acts as a collimator lens for the beam of light to issue from the stationary optical unit 52A and as a condenser lens for the beam of light returned to the stationary optical unit 52A. For this reason, only two lenses 62 and 70 suffice in the stationary optical unit 52A of the head arrangement of the first preferred embodiment of the present invention, in contrast to the stationary optical unit of the prior-art head arrangements described with reference to FIGS. 1 to 3 in which three lenses 22, 34 and 36 are used in the stationary optical unit. One of the outstanding advantages of the first preferred embodiment of the present invention over the prior-art head arrangement of FIGS. 1 to 3 is therefore the small-sized, compact construction of the stationary optical unit 52A which uses only two lenses 62 and 70.

Referring also to FIG. 6, the movable optical unit 54A of the information record/pickup head assembly embodying the present invention further comprises a casing 74 having the deflector mirror 66 and object lens 68 fixedly accommodated therein. The casing 74 is securely coupled to a carrier 76 supported movably on an elongated guide member 78 extending from and fixedly connected to the stationary optical unit 52A in parallel with the information carrying surface F of the information storage disk D. The casing 74 is provided with an opening 74a through which the beam of light from the stationary optical unit 52A is allowed into the movable optical unit 54A or the beam of light reflected from the deflector mirror 66 of the movable optical unit 54A is to be allowed out of the movable optical unit 54A. The carrier 76 is movable on and along the guide member 78 in opposite directions indicated by arrows r' and s' in parallel with the information carrying surface F of the information storage disk D. The movable optical unit 54A as a whole is thus movable over a maximum distance L with respect to the information storage disk D as indicated by the arrows r and s, respectively, in FIG. 4 so that the beam of light incident on the information storage disk D is correctly focussed at a particular track of information storage pits in the information carrying surface F of the information storage disk D. For this purpose, the movable optical unit 54A further comprises drive means such as typically a linear-motion drive motor (not shown) which may be included in the carrier 76 so that, during tracking operation of the information record/pickup head assembly, the movable optical unit 54A is driven to move radially of the information storage disk D to any position exemplified by broken lines. The information storage disk D is rotatablly supported by means of, for example, a suitable chucking member 80 and is driven for rotation about the center axis thereof by means of a drive motor (not shown) which is operatively coupled to the chucking member 80.

An information storage disk for use in an optical information recording and/or reproducing apparatus is ordinarily subject to warp or axial deformation as indicated by broken and dots-and-dash lines in FIG. 6 and, for this reason, the plane on which the beam of light is to be incident on the information storage disk is subject to fluctuations. Due to such fluctuations in the light receiving plane of the information storage disk, a beam of light incident on the disk may happen to be focussed short of or beyond the light receiving plane of the disk. In the description to follow, a beam of light focussed on a plane located ahead of the light receiving plane of an information storage disk will be referred to as being "under-focussed" with respect to the light receiving plane of the disk and a beam of light focussed on a plane located beyond the light receiving plane of the information storage disk referred to as being "over-focussed" with respect to the light receiving plane of the disk. A beam of light focussed on a plane exactly coincident with the light receiving plane of an information storage disk will be referred to as being "correctly focussed" with respect to the light receiving plane of the disk. The light receiving plane of the information storage disk D herein shown is tangibly defined by the information carrying surface F of the disk D. When the information storage disk D is deformed away from the object lens 68 as indicated by broken lines in FIG. 6, the beam of light incident on the information carrying surface F of the disk D will be under-focussed with respect to the light receiving plane of the disk D. When the information storage disk D is deformed toward the object lens 68 as indicated by dots-and-dash lines in FIG. 6, the beam of light incident on the information carrying surface F of the disk D will be over-focussed with respect to the light receiving plane of the disk D.

Figure 7A:
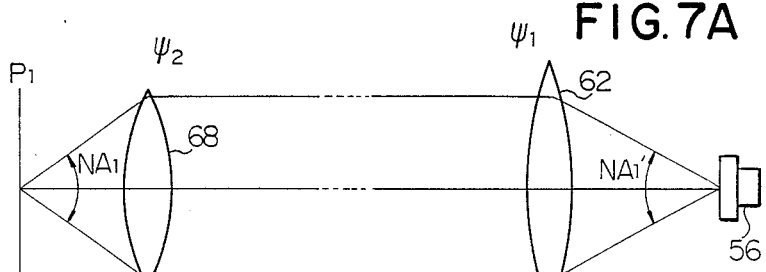
FIGS. 7A, 7B and 7C are schematic views showing different arrangements of the collimator and object lenses included in the stationary and movable optical units, respectively, of the information record/pickup head assembly illustrated in FIGS. 4, 5 and 6.
Figure 7B:
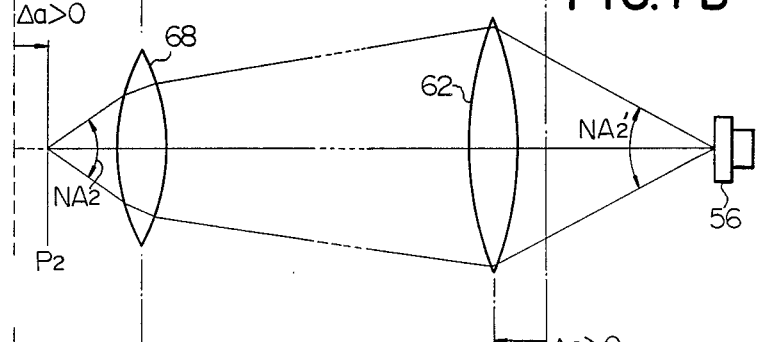
Figure 7C:
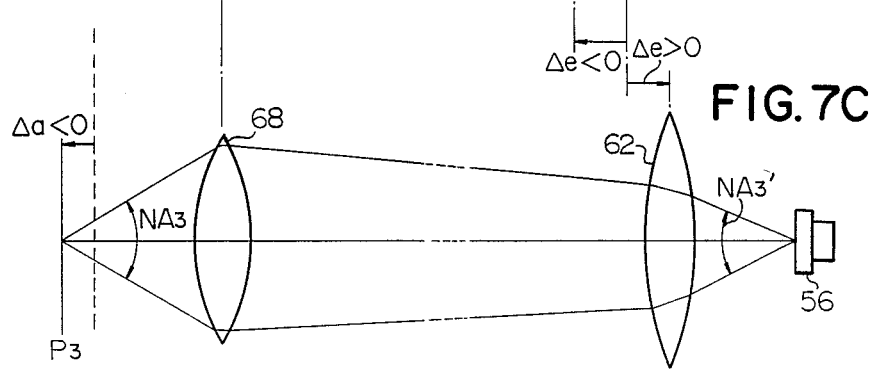

FIGS. 7A, 7B and 7C show different arrangements of the collimator and object lenses 62 and 68 which are located so that the beam of light incident on the information storage disk D is correctly focussed on the disk D when the information carrying surface F of the disk D is located on different planes with respect to the object lens 68.

In the lens arrangement illustrated in FIG. 7A, the collimator and object lenses 62 and 68 are located with respect to the information storage disk D which is free from axial deformation and which accordingly has the information carrying surface F located on a preset normal plane of incidence $P_1$ with respect to the object lens 68. In this instance, the beam of light incident on the information storage disk D is correctly focussed with respect to the information carrying surface F with each of the lenses 62 and 68 located at predetermined normal distances from the normal incidence plane $P_1$ to form therebetween a path of light having a distance e.

The arrangement of the collimator and object lenses 62 and 68 as illustrated in FIG. 7B is such that the lenses 62 and 68 are located with respect to the information storage disk D which is axially deformed to have the information carrying surface F located on a plane of incidence $P_2$ closer a distance $+\Delta a$ ($>0$) toward the object lens 68. In this lens arrangement, the collimator lens 62 is moved closer a distance $-\Delta e$ ($<0$) toward the object lens 68 so that the beam of light which would otherwise be over-focussed with respect to the information carrying surface F of the disk D is correctly focussed on the surface F of the disk D. In the arrangement of the collimator and object lenses 62 and 68 as illustrated in FIG. 7B, the lenses 62 and 68 are located with respect to the information storage disk D which is axially deformed to have the information carrying surface F located on a plane of incidence $P_3$ remoter a distance $-\Delta a$ ($<0$) away from the object lens 68. In this instance, the collimator lens 62 is moved remoter the distance $-\Delta e$ ($<0$) away from the object lens 68 so that the beam of light which would otherwise be under-focussed with respect to the information carrying surface F of the disk D is correctly focussed on the surface F of the disk D.

In order, now, that the spot of light incident on the information carrying surface F of the information storage disk D is to be properly sized, it is important that the numerical aperture for the object lens 68 be larger than a certain value. The numerical apertures associated with the information storage disk D for the lens arrangements of FIGS. 7A, 7B and 7B are denoted by $NA_1$, $NA_2$ and $NA_3$, respectively, and the numerical apertures associated with the laser generator 56 for the lens arrangements of FIGS. 7A, 7B and 7B are denoted by $NA_1'$, $NA_2'$ and $NA_3'$, respectibely. The numerical aperture $NA_2$ associated with the information storage disk D for the lens arrangement of FIG. 7B is dictated by the effective diameter of the collimator lens 62 on which the numerical aperture $NA_2'$ depends. On the other hand, the numerical aperture $NA_3$ associated with the information storage disk D for the lens arrangement of FIG. 7B is dictated by the effective diameter of the object lens 68 per se.

This means that the diameter of the object lens 68 included in the movable optical unit 54A can be sufficiently reduced if the diameter of the collimator lens 62 is sufficiently increased or the collimator lens 62 is located closer to the information storage disk D as in the arrangement shown in FIG. 7B so that the beam of light passed from the collimator lens 62 to the object lens 68 is focussed on a plane located within the possible range of deformation of the disk D.

Assume now that the object lens 68 has a power $\psi_1$ ($>0$) and the collimator lens 62 has a power $\psi_2$ ($>0$), wherein the power of a lens is defined as the reciprocal of the focal distance of the lens. In this instance, the relationship between the amount of deformation $\Delta a$ (which is positive toward the object lens 68) of the information carrying surface S of the information storage disk D and the distance of movement $\Delta e$ (which is positive toward the laser generator 56) of the collimator lens 62 is determined, when paraxial rays are traced with the surface S of the disk D regarded as the object point, by the equation $$\Delta e = (-B + \sqrt{B^2 - 4AC})/2A \quad \text{Eq. 1}$$

where $A = \psi_2^2(a' - \psi_1),$ $B = \psi_2(\psi_1 + \psi_2 - a' - e\psi_2(\psi_1 - a')),$ $C = a' - \psi_1,$ and $a' = 1/(1/\psi_1 - \Delta a).$ When, for example, the power $\psi_1$ of the object lens 68 is 1/7.0, the power $\psi_2$ of the collimator lens 62 is 1/5.0, the amount of deformation $\Delta a$ is 0.5 mm and the distance of movement $\Delta e$ is 40.0 mm and, thus, the focal distance (=5 mm) of the collimator lens 62 is less than that (=7.0 mm) of the object lens 68, then the distance $\Delta e$ of movement of the collimator lens 62 is calculated −0.199 mm. This means that the beam of light incident on the information storage disk D deformed a distance of 0.5 mm can be correctly focussed when the collimator lens 62 is moved toward the object lens 68 over a distance of 0.199 which is less than the distance of deformation of the disk D. Moving the collimator lens 62 such a small distance is far more advantageous than to move the object lens 68 for the correct focusing of the beam.

If, on the other hand, the power $\psi_1$ of the object lens 68 is 1/5.0, the power $\psi_2$ of the collimator lens 62 is 1/5.0, the amount of deformation $\Delta a$ is +0.5 mm and the distance of movement $\Delta e$ is 40.0 mm and, thus, both of the collimator and object lenses 62 and 68 have equal focal distances (=5 mm), then the distance $\Delta e$ of movement of the collimator lens 62 is calculated −0.314 mm, which is also less than the distance of deformation of the disk D.

Second Preferred Embodiment

Figure 8:
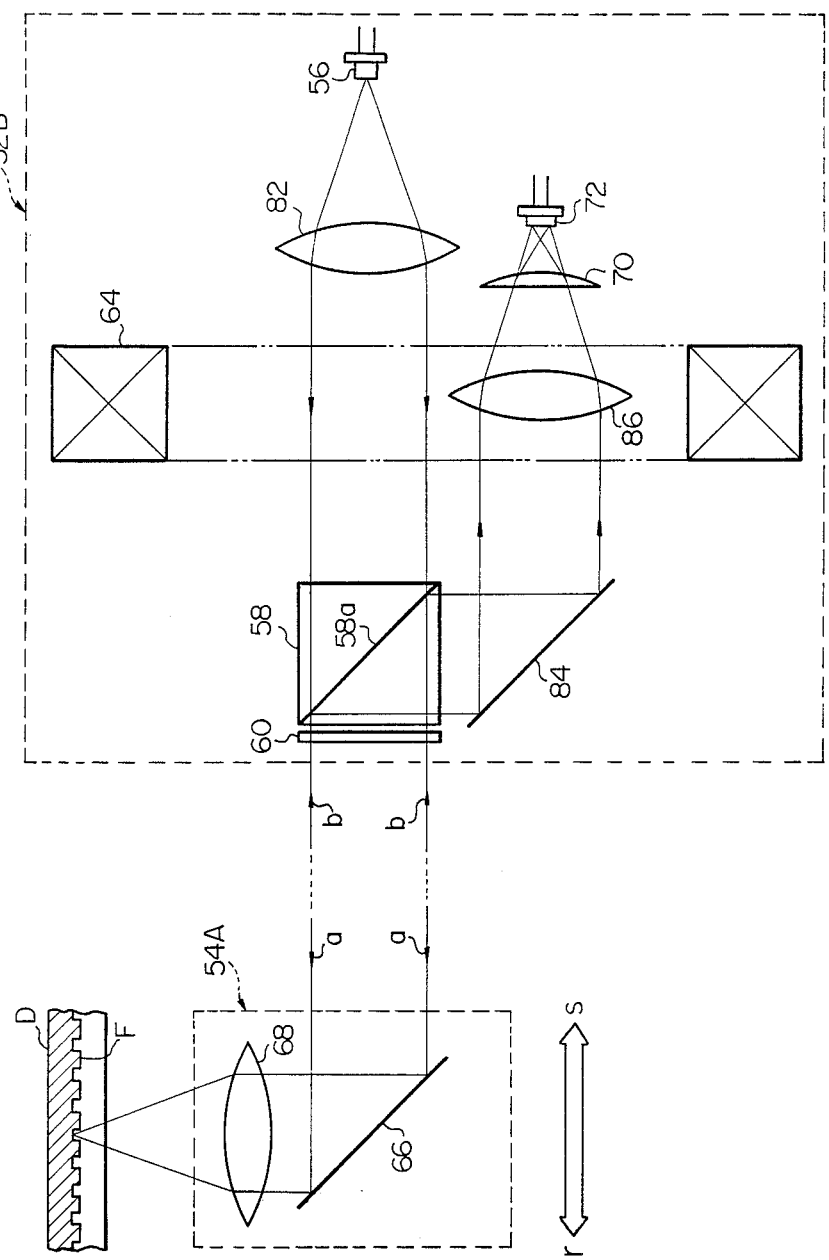
FIG. 8 is a schematic side elevation view showing the optical arrangement of a modification of the embodiment of the information record/pickup head assembly illustrated in FIGS. 4, 5 and 6.

FIG. 8 shows the optical arrangement of a second preferred embodiment of an information record/pickup head assembly according to the present invention. The information record/pickup head assembly herein shown is a modification of the embodiment hereinbefore described with reference to FIGS. 4, 5 and 6 and is also adapted to achieve a large numerical aperture for the collimator lens 68 and comprises a movable optical unit 54A similar to that of the embodiment hereinbefore described.

In the information record/pickup head assembly shown in FIG. 8, the stationary optical unit, now represented by 52B, comprises a collimator lens 82 located between a, laser generator 56 and a beam splitter prism 58 with a polarizing plate 60 located posterior to the beam splitter prism 58 in the path of light from the laser generator 56. The linearly polarized beam of light emitted from the laser generator 56 is thus collimated by the collimator lens 62, transmitted through the junction plane 58a of the beam splitter prism 58, and circularly polarized through the polarizing plate 60. The beam of light then emerges from the stationary optical unit 52B and is directed through the movable optical unit 54A to the information storage disk D, reflected from the information storage disk D, passed backwardly through the movable optical unit 54A, and admitted for a second time into the stationary optical unit 52B. The beam of light thus admitted backwardly into the stationary optical unit 52B is linearly polarized through the polarizing plate 62 and is re-directed at an angle of 90 degrees from the beam deflecting junction plane 58a of the beam splitter prism 58.

The stationary optical unit 52B in the head arrangement herein shown further comprises a deflector mirror 84 having a reflective plane inclined at an angle of 45 degrees to the path of the laser beam from the stationary optical unit 52A. The beam of light deflected at 90 degrees from the junction plane 58a of the beam splitter prism 58 is incident on this deflector mirror 84 and is further deflected at an angle of 90 degrees therefrom to advance in parallel with the beam of light from the collimator lens 82 to the beam splitter prism 58. The beam of light thus advancing away from the deflector mirror 84 is passed through a condenser lens 86 and a semicylindrical focusing lens 70 and is thereby focussed onto a four-segment optoelectric transducer element 72 which also forms part of the stationary optical unit 52B. The collimator lens 82 located between the laser generator 56 and the beam splitter prism 58 and the condenser lens 86 located between the deflector mirror 84 and the optoelectric transducer element 72 have equal or approximately equal focal distances. These lenses 82 and 86 are movable within the stationary optical unit 52B and are fixedly disposed on a carrier (not shown) on which a focusing actuator 64 is further supported. The focusing actuator 64 is operative to drive both of the collimator and condenser lenses 82 and 86 for movement along and in parallel with the optical axis of the lens 82 as indicated by arrows p and q. The focusing actuator 64 may be of the type comprising a voice coil assembly, though not shown in the drawings.

In the head arrangement hereinbefore described with reference to FIG. 8, two lenses 82 and 86 are used in substitution for the single collimator lens 62 in the stationary optical unit 52A of the arrangement described with reference to FIGS. 4, 5 and 6. Of these two lenses 82 and 86, it is the collimator lens 82 which is equivalent to the collimator lens 62 in the lens arrangements illustrated in FIGS. 7A to 7B. In the optical arrangement shown in FIG. 8, however, the collimator lens 82 can be located closer to the laser generator 56 than the collimator lens 62 in the arrangement of FIGS. 4, 5 and 6 so that adequately large numerical apertures associated with the laser generator 56 can be achieved if the lens 82 may be relatively small sized. It may also be noted that the distance of movement $\Delta e$ of the collimator lens 82 to be moved for the correct focusing of a beam on a deformed information storage disk can be minimized if the collimator lens 82 is selected to have a focal distance smaller than that of the object lens 68 used in the movable optical unit 54A.

Figure 9:
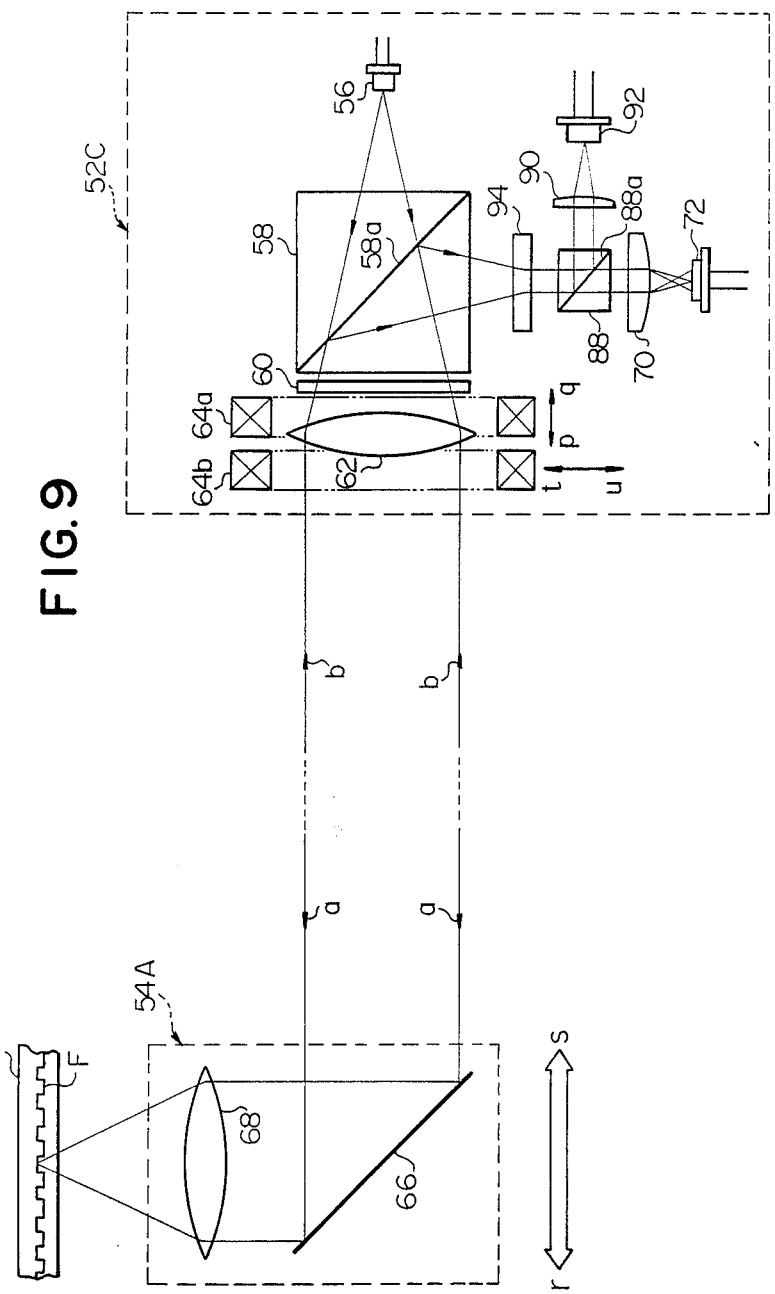
FIG. 9 is a schematic side elevation view showing the optical arrangement of another modification of the embodiment of the information record/pickup head assembly illustrated in FIGS. 4, 5 and 6.

The tracking motion of the information record/pickup head assembly embodying the present invention has been assumed to depend solely on the movement of the movable optical unit 54A with respect to the information storage disk D but may be minutely adjusted by moving the collimator lens 62 of the arrangement of FIGS. 4, 5 and 6 or the collimator lens 82 of the arrangement of FIG. 8 in a direction perpendicular to the optical axis of the lens. FIG. 9 shows the optical arrangement of such an information record/pickup head assembly.

Third Preferred Embodiment

The information record/pickup head assembly shown in FIG. 9 is another modification of the embodiment hereinbefore described with reference to FIGS. 4, 5 and 6 and comprises a stationary optical unit 52B which features first and second or focusing and tracking actuators 64a and 64b provided in association with the collimator lens 62 located posterior to the quarter-wave plate 62. The first or focusing actuator 64a is adapted to drive the collimator lens 62 for movement along the optical axis of the lens 62 as indicated by arrows p and q to adjust the location of the focal point of the object lens 68 in accordance with the principles described with reference to FIGS. 7A to 7B. The second or tracking actuator 64b is adapted to drive the lens 62 for movement in a direction perpendicular to the optical axis of the lens as indicated by arrows t and u to minutely adjust the location of the tracking point. Each of the first and second or focusing and tracking actuators 64a and 64b may be also of the type comprising a voice coil assembly, though not shown in the drawings.

The stationary optical unit 52C of the information record/pickup head assembly shown in FIG. 9 further features an additional or second beam splitter prism 88 located intermediate between the main or first beam splitter prism 58 and the semicylindrical focusing lens 70 disposed ahead of the optoelectric transducer element 72. The second beam splitter prism 88 has a beam deflecting junction plane 88a inclined at an angle of 45 degrees to the path of the beam of light deflected from the first beam splitter prism 58. The beam of light deflected at 90 degrees from the junction plane 58a of the first beam splitter prism 58 and admitted into the second beam splitter prism 88 is in part transmitted through the junction plane 88a of the prism 88 toward the semicylindrical focusing lens 70 and in part deflected from the junction plane 88a at an angle of 90 degrees to the beam of light incident on the second beam splitter prism 88.

In the stationary optical unit 52C of the head arrangement herein shown, the semicylindrical focusing lens 70 and optoelectric transducer element 72 form part of the light sensitive means which further comprises an object lens 90 located in the path of the beam of light deflected from the junction plane 88a of the second beam splitter prism 88 as shown. The beam of light deflected at 90 degrees from the junction plane 58a of the second beam splitter prism 88 is thus passed through the object lens 90 and is thereby focussed onto a second four-segment optoelectric transducer element 92 which also forms part of the light sensitive means of the stationary optical unit 52C. The four-segment transducer 92 implements a data detector which detects data information recorded on the information storage disk D, while the four-segment optoelectric transducer element 72 detects whether the beam of light incident on the information carrying surface F of the information storage disk D is over-focussed, under-focussed or otherwise correctly focussed.

Where the additional beam splitter prism 88, focusing lens 90 and optoelectric transducer element 90 are thus provided in the stationary optical unit 52C, there may be further provided a concave lens 94 located intermediate between the first and second beam splitter prisms 58 and 88 as shown. The concave lens 94 is provided for the purpose of adding to the length of the path of light from the first beam splitter prism 58 to cope with the provision of the additional beam splitter prism 88.

As will have been understood from the foregoing description, the third embodiment of the present invention is distinct over the previously described first embodiment in that the former has the actuator tailored to minutely control the tracking motion of the information record/pickup head assembly and in that the data contained in the information read from the information storage disk D is responded to by one optoelectric transducer and the focus control information is responded to by another optoelectric transducer. The first embodiment of the present invention may be modified in a manner to include one of these two outstanding features of the third embodiment or, if desired, the features of the second embodiment may be realized in the second embodiment of the present invention.

Fourth Preferred Embodiment

FIG. 10 shows the general arrangement of a fourth preferred embodiment of an information record/pickup head assembly according to the present invention.

The embodiment of an information record/pickup head assembly according to the present invention as shown in FIG. 10 is basically similar to the embodiment described with reference to FIGS. 4, 5 and 6 and differs from the embodiment of FIGS. 4 to 6 simply in that the stationary optical unit, now represented by 52D, additionally comprises a deflector mirror 96 in the path of light from the collimator lens 62 of the stationary optical unit 52D to the movable optical unit 54A. The deflector mirror 96 has a reflective surface inclined at an angle of 45 degrees to the path of light from the collimator lens 62 and to the path of light toward the movable optical unit 54A. The deflector mirror 96 is arranged to be pivotally movable about an axis parallel with the path of light to the mirror 96 from the collimator lens 62. The beam of light emerging from the collimator lens 62 is thus deflected at an angle of 90 degrees from the deflector mirror 96 and thence advances toward the movable optical unit 54A as indicated by arrows a or the beam of light admitted back into the stationary optical unit 52D from the deflector mirror 66 of the movable optical unit 54A as indicated by arrows b is further deflected at an angle of 90 degrees from the deflector mirror 96 and is thence passes through the collimator lens 62 and polarizing plate 60 to the beam splitter prism 58.

Figure 11:
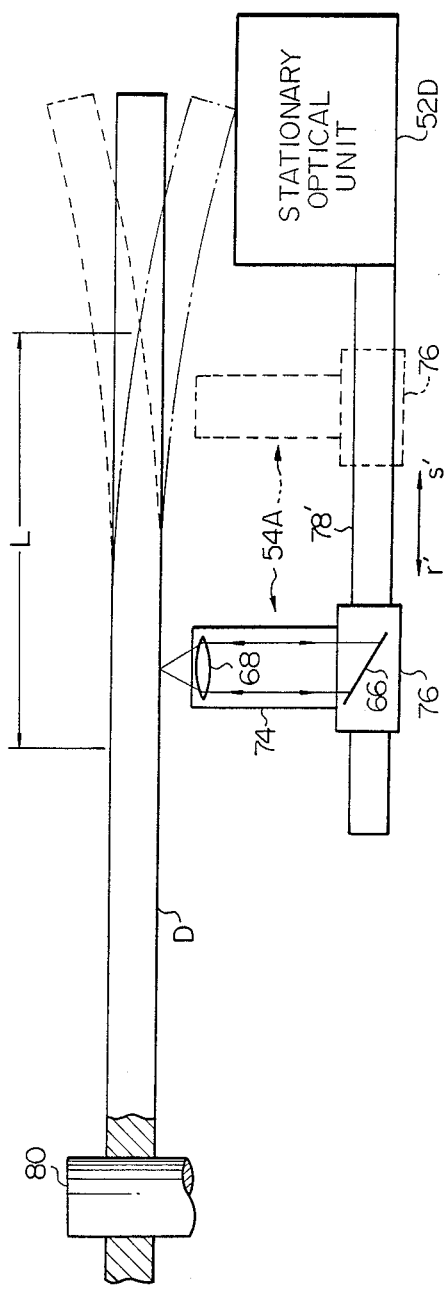
FIG. 11 is a side elevation view showing, to a reduced scale, the arrangement by means of which the stationary and movable optical units forming the information record/pickup head assembly illustrated in FIG. 10 are mechanically coupled together with respect to a information storage disk loaded into the recording and/or reproducing apparatus.

Referring also to FIG. 11, the movable optical unit 54A of the information record/pickup head assembly shown in FIG. 10 further comprises a casing 74 having the deflector mirror 66 and object lens 68 fixedly accommodated therein. The casing 74 is securely coupled to a carrier 76 supported movably on an arcuately curved guide member 78' extending from and fixedly connected to the stationary optical unit 52D in parallel with the information carrying surface F of the information storage disk D. As will be better seen from FIG. 12, the guide member 78' is curved in an arc having a center axis coincident with the axis of pivotal motion of the deflector mirror 96.

Figure 12:
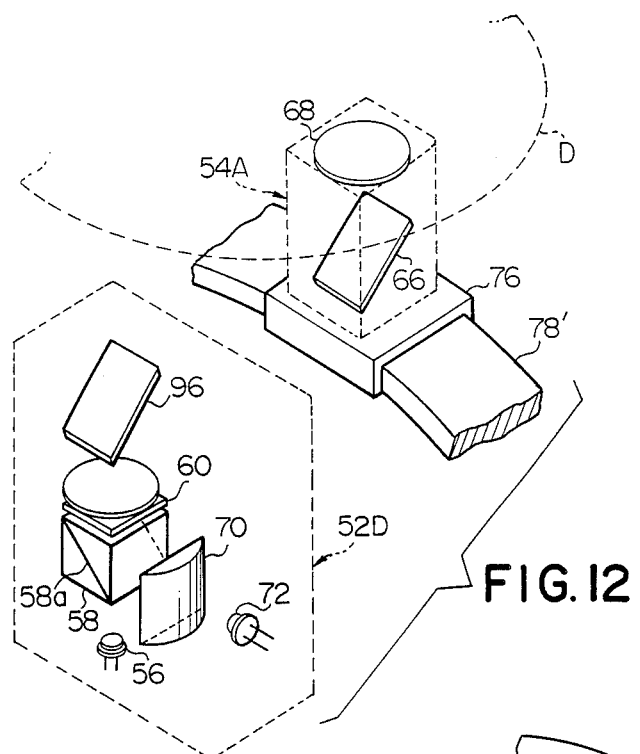
FIG. 12 is a schematic perspective view showing, partially cut away, the optical arrangement of the information record/pickup head assembly illustrated in FIGS. 10 and 11.
Figure 13:
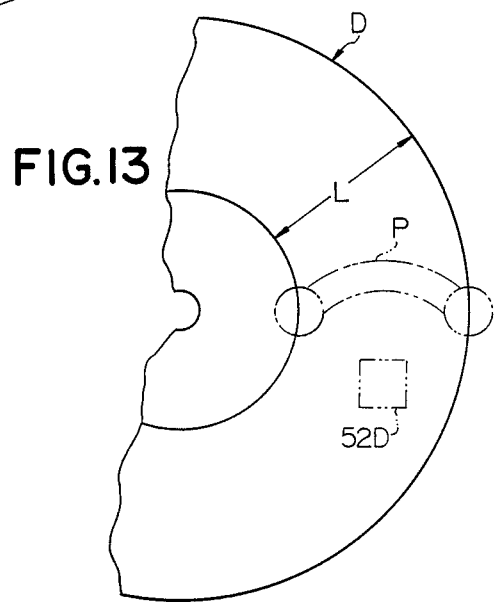
FIG. 13 is a fragmentary plan view showing the arrangement in which the movable optical unit of the embodiment shown in FIGS. 10 to 12 is movable with respect to the information storage disk.

The carrier 76 is movable on and along the arcuately curved guide member 78 in opposite directions indicated by arrows r' and s' in parallel with the information carrying surface F of the information storage disk D. The deflector mirror 96 is driven to pivotally move in synchronism with the carrier 76 for directing the beam of light toward the movable optical unit 54A while maintaining the effective distance of the optical path substantially unchanged. The movable optical unit 54A as a whole is thus movable over a maximum distance L with respect to the information storage disk D as indicated by the arrows r' and s', respectively, in FIG. 11 so that the beam of light incident on the information storage disk D is correctly focussed at a particular track of information storage pits in the information carrying surface F of the information storage disk D. While the movable optical unit in each of the embodiments thus far described is movable straight radially of the information storage disk D, the movable optical unit 54A in the embodiment shown in FIGS. 10, 11 and 12 is arcuately movable radially of the information storage disk D along an arcuately curved path P with respect to the information carrying surface of the information storage disk D as shown in FIG. 13. For this purpose, the movable optical unit 54A further comprises drive means such as typically a linear-motion drive motor (not shown) which may be included in the carrier 76 so that, during tracking operation of the information record-/pickup head assembly, the movable optical unit 54A is driven to move radially of the information storage disk D to any position exemplified by broken lines in FIG. 11.

While the stationary optical unit of the fourth preferred embodiment of the present invention as above described has been assumed to be similar in construction and effect to that of the first embodiment of the present invention but, if desired, may be substituted by the stationary optical unit of the second or third embodiment of the present invention.

Fifth Preferred Embodiment

FIG. 14 shows the arrangement of a fifth preferred embodiment of an information record/pickup head assembly according to the present invention. In the embodiment of the present invention herein shown, the stationary optical unit, now represented in its entirety by 52E, is in various respects similar to the stationary optical unit of the embodiment hereinbefore described with reference to FIG. 8.

The stationary optical unit 52E in the embodiment shown in FIG. 14 comprises a collimator lens 82 located between a laser generator 56 and a beam splitter prism 58 with a polarizing plate 60 located posterior to the beam splitter prism 58 in the path of light from the laser generator 56. The linearly polarized beam of light emitted from the laser generator 56 is thus collimated by the collimator lens 62, transmitted through the junction plane 58a of the beam splitter, prism 58, and circularly polarized through the polarizing plate 60. The beam of light then emerges out of the stationary optical unit 52E and is directed through the movable optical unit 54B to the information storage disk D, reflected from the information storage disk D, passed backwardly through the movable optical unit 54B, and admitted for a second time into the stationary optical unit 52E. The beam of light thus admitted backwardly into the stationary optical unit 52E is linearly polarized through the polarizing plate 62 and is re-directed at an angle of 90 degrees from the junction plane 58a of the beam splitter prism 58.

The stationary optical unit 52E in the fifth preferred embodiment of the present invention further comprises a deflector mirror 84 having a reflective plane inclined at an angle of 45 degrees to the path of the laser beam from the stationary optical unit 52A. The beam of light deflected at 90 degrees from the junction plane 58a of the beam splitter prism 58 is incident on this deflector mirror 84 and is further deflected at an angle of 90 degrees therefrom to advance in parallel with the beam of light from the collimator lens 82 to the beam splitter prism 58. The beam of light thus advancing away from the deflector mirror 84 is passed through a condenser lens 86 and a semicylindrical focusing lens 70 and is thereby focussed onto a four-segment optoelectric transducer element 72. The laser generator 56, collimator lense 82, beam splitter prism 58, quarter-wave plate 60, deflector mirror 84, condenser lens 86, focusing lens 70 and optoelectric transducer element 72 are all accommodated within a casing 98 which forms part of the stationary optical unit 52E and is fixedly positioned in the information recording and/or reproducing apparatus.

The collimator lens 82 located between the laser generator 56 and the beam splitter prism 58 and the condenser lens 86 located between the deflector mirror 84 and the optoelectric transducer element 72 have equal or approximately equal focal distances. These lenses 82 and 86 are securely supported on a common lens carrier 100 movable within the stationary optical unit 52B through slots formed in the casing 98 as indicated at 102 and 102, On this lens carrier 100 is further supported a focusing actuator 64 which is operative to drive both of the collimator and condenser lenses 82 and 86 for movement along and in parallel with the optical axis of the lens 82 as indicated by arrows p and q. The focusing actuator 64 may be of the type comprising a voice coil assembly, though not shown in the drawings.

A linearly polarized beam of light emitted from the laser generator 56 is first collimated by the collimator lens 62, transmitted through the junction plane 58a of the beam splitter prism 58, and circularly polarized through the polarizing plate 60. The stationary optical unit 52E arranged as hereinbefore described is provided in combination with a movable optical unit 54B which is operatively coupled to the stationary optical unit 52E by means of a light transmitter element 104.

The casing 98 forming part of the stationary optical unit 52E comprises a bearing assembly 106 including a fixed race member 106a securely attached to the casing 98 and a rotatable race member 106b rotatably engaged by the fixed race member 106a by means of a series of bearing elements. The bearing assembly 106 is disposed to have a center axis aligned with the optical axis of the beam of light emanating from the beam splitter prism 58 and square-wave plate 60.

The light transmitting element 104 intervening between the stationary and movable optical units 52E and 54B is comprised of an elongated prism 108 which has an end portion fixedly attached to the rotatable race member 106b of the bearing assembly 106. The elongated prism 108 is thus rotatable with respect to the stationary optical unit 52E about the center axis of the bearing assembly 106. The prism 108 has a first reflective surface 108a located at the end of the prism 108 adjacent the bearing assembly 106 and inclined at an angle of 45 degrees to the path of the beam of light from the collimator lens 62 and square-wave plate 60 and a second reflective surface 108b located at the opposite end of the prism 108 and parallel with the first reflective surface 108a. The second reflective surface 108b of the prism 108 is equivalent to the deflector mirror 66 in each of the hereinbefore described embodiments of the present invention and forms part of the movable optical unit 54B. Thus, the movable optical unit 54B further comprises a condensing object lens 68 located with respect to the optical information storage disk D.

The beam of light transmitted through the beam splitter prism 58 and then the quarter-wave plate 60 enters the light transmitting prism 108 and is reflected at the first reflective surface 108a of the prism 108 to advance toward the second reflective surface 108b of the prism 108 as indicated by arrows a. The beam of light is deflected at an angle of 90 degrees from the second reflective surface 108b of the light transmitting prism 108 and is thence focussed through the condensing object lens 68 onto the information carrying surface of the disk D. The beam of light is then reflected from the information carrying surface of the information storage disk D and is re-directed through the lens 68, second and first reflective surfaces 106b and 106a of the light transmitting prism 108 as indicated by arrows b and, past the quarter-wave plate 60, enters the beam splitter prism 58 of the stationary optical unit 52E for a second time. The polarized beam of light thus admitted into the beam splitter prism 58 is transmitted through the beam-deflecting junction plane 58a of the beam splitter prism 58 and is re-directed at an angle of 90 degrees at the beam deflector mirror 84. Past the deflector mirror 84, the beam of light advances through the condenser and focusing lenses 86 and 70 also accommodated within the casing 98 and is focussed onto the four-segment optoelectric transducer element 72.

The movable optical unit 54B is thus pivotally connected to the stationary optical unit 52E by means of the bearing assembly 106 and is thus rotatable about the center axis of the bearing assembly 106. In the movable optical unit 54B of the embodiment herein shown, the condenser lens 68 and the second relative surface 108b of the prism 108 implement focusing means for focusing a beam of light on the information carrying surface of the information storage disk D. The movable optical unit 54B including such focusing means is pivotally connected to the stationary optical unit 52E and is thus rotatable about the center axis of the bearing assembly 106. The focusing means provided in the information record/pickup head assembly herein shown is accordingly movable in an arc either in the direction of arrow c or in the direction of arrow c' with respect to the information storage disk D about the center axis of the bearing assembly 106 as illustrated in FIG. 15. The stationary optical unit provided in the fifth preferred embodiment of the present invention as above described has been assumed to be similar in construction and effect to that of the second embodiment of the invention but, if desired, may be substituted by the stationary optical unit of the first or third embodiment of the invention.

Sixth Preferred Embodiment

Figure 16:
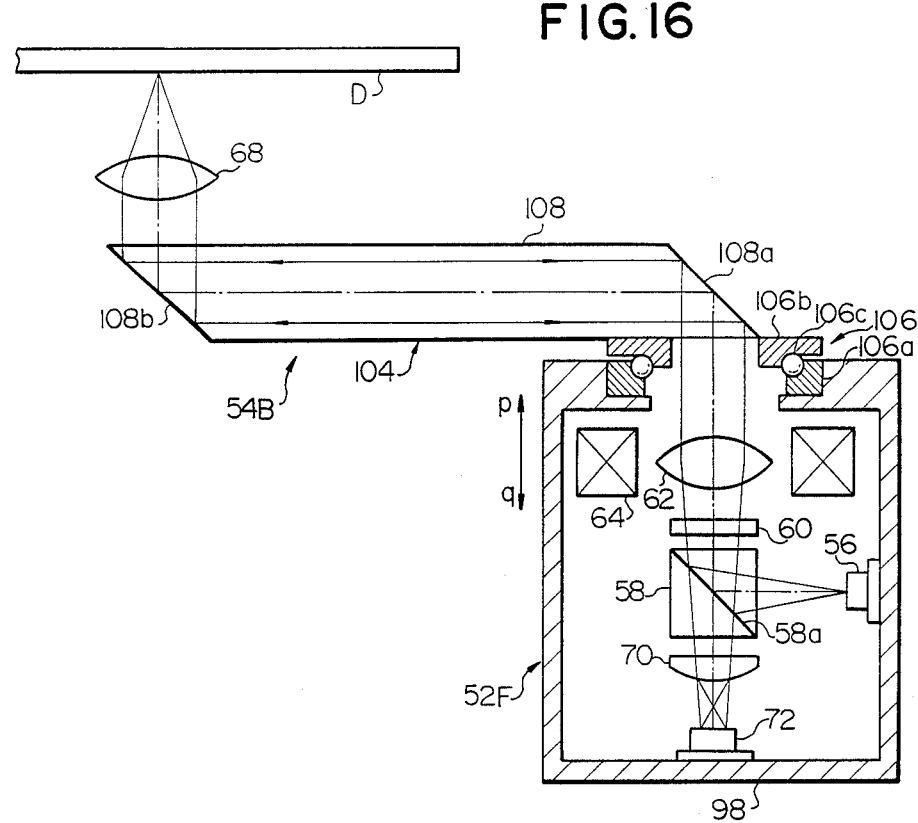
FIG. 16 is a schematic side elevation view showing the optical arrangement of a seventh preferred embodiment of an information record/pickup head assembly according to the present invention.

FIG. 16 shows the optical arrangement of a sixth preferred embodiment of an information record/pickup head assembly according to the present invention. The information record/pickup head assembly herein shown is a modification of the embodiment hereinbefore described with reference to FIGS. 14 and 15. The embodiment herein shown is, in essence, characterized by the stationary optical unit of the first embodiment used in the fifth embodiment of the present invention.

Such an information record/pickup head assembly illustrated in FIG. 16 comprises a movable optical unit 54B similar to that of the embodiment hereinbefore described.

In the information record/pickup head assembly shown in FIG. 16, the stationary optical unit, now represented by 52F, comprises a beam splitter prism 58 located immediately ahead of a laser generator 56 and having a beam deflecting junction plane 58a inclined at an angle of 45 degrees to the path of light from the laser generator 56. Posterior to the beam splitter prism 58 is located a collimator lens 82 with a polarizing plate 60 disposed between the beam splitter prism 58 and the polarizing plate 60. The linearly polarized beam of light emitted from the laser generator 56 is thus first deflected at an angle of 90 degrees at the junction plane 58a of the beam splitter prism 58, circularly polarized through the polarizing plate 60, and collimated by the collimator lens 62. The beam of light then emerges out of the stationary optical unit 52F and is directed through the movable optical unit 54B to the information storage disk D, reflected from the information storage disk D, passed backwardly through the movable optical unit 54B, and admitted for a second time into the stationary optical unit 52F. The beam of light thus admitted backwardly into the stationary optical unit 52F is linearly polarized through the polarizing plate 62 and is transmitted through the junction plane 58a of the beam splitter prism 58. The beam of light transmitted through the junction plane 58a of the beam splitter prism 58 is passed through a semicylindrical focusing lens 70 and is thereby focussed onto a four-segment optoelectric transducer element 72.

The laser generator 56, beam splitter prism 58, quarter-wave plate 60, collimator lense 82, focusing lens 70 and optoelectric transducer element 72 are all accommodated within a casing 98 which forms part of the stationary optical unit 52E and is fixedly positioned in the information recording and/or reproducing apparatus. The collimator lens 62 is securely supported on a lens carrier (not shown) movable within the stationary optical unit 52E and further having supported thereon a focusing actuator 64 which is operative to drive both of the collimator lens 64 for movement along and in parallel with the optical axis of the lens 64 as indicated by arrows p and q. The focusing actuator 64 may also be of the type comprising a voice coil assembly, though not shown in the drawings.

The stationary optical unit 52F arranged as hereinbefore described is provided in combination with a movable optical unit 54B which is operatively coupled to the stationary optical unit 52F by means of a light transmitter element 104 as in the embodiment described with reference to FIGS. 14 and 15.

The casing 98 of the stationary optical unit 52E in the embodiment herein shown also comprises a bearing assembly 106 including a fixed race member 106a securely attached to the casing 98 and a rotatable race member 106b rotatably engaged by the fixed race member 106a by means of a series of bearing elements. The bearing assembly 106 is disposed to have a center axis aligned with the optical axis of the beam of light emanating from the beam splitter prism 58 and polarizing plate 60. Furthermore, the light tranmitter element 104 intervening between the stationary and movable optical units 52F and 54B is comprised of an elongated prism 108 which has an end portion fixedly attached to the rotatable race member 106b of the bearing assembly 106. The elongated prism 108 is thus rotatable with respect to the stationary optical unit 52E about the center axis of the bearing assembly 106. The prism 108 has a first reflective surface 108a located at the end of the prism 108 adjacent the bearing assembly 106 and inclined at an angle of 45 degrees to the path of the beam of light from the collimator lens 62 and polarizing plate 60 and a second reflective surface 108b located at the opposite end of the prism 108 and parallel with the first reflective surface 108a.

Seventh Preferred Embodiment

Figure 17:
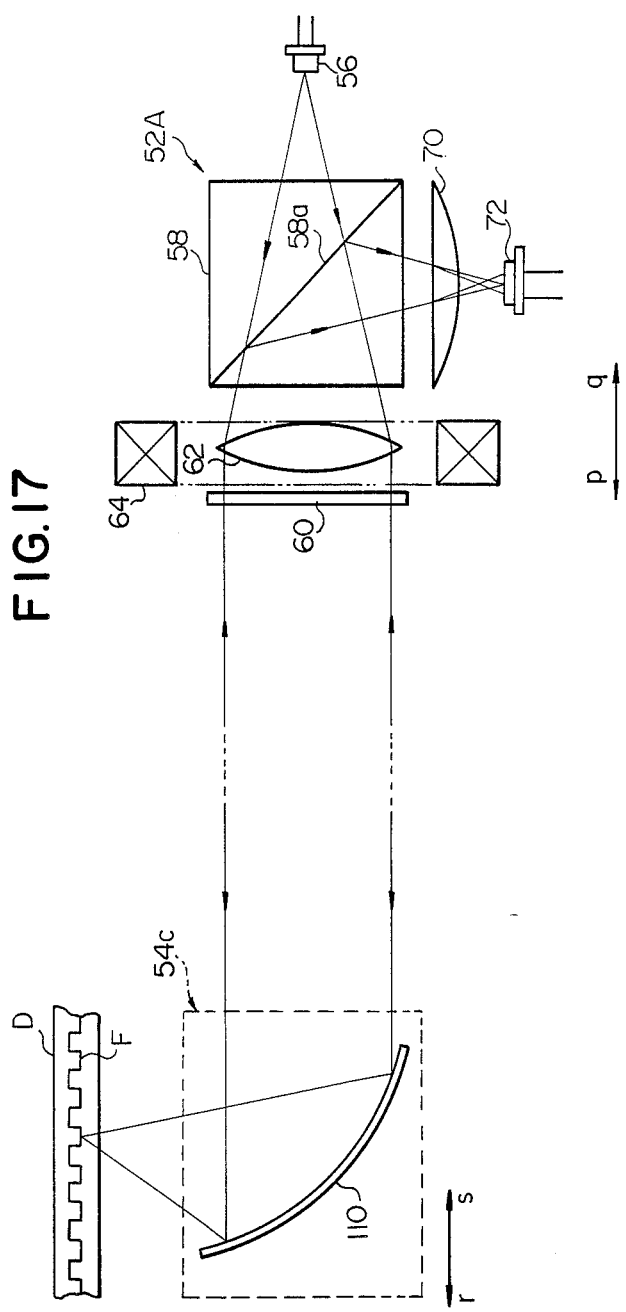
FIG. 17 is a schematic side elevation view showing the general optical arrangement of a seventh preferred embodiment of an information record/pickup head assembly according to the present invention.

FIG. 17 shows the general optical arrangement of a seventh preferred embodiment of an information record/pickup head assembly for use in an optical information recording and/or reproducing apparatus in accordance with the present invention. In the embodiment of the present invention herein shown, the stationary optical unit is similar to the stationary optical unit 52A of the embodiment hereinbefore described with reference to FIGS. 4, 5 and 6 and as such the construction and arrangement thereof will not be herein described.

In the embodiment shown in FIG. 17, the movable optical, unit, now represented by 54C, comprises a reflective focusing element which is, for itself, equivalent to the combination of the deflector mirror (or its equivalent reflective surface) and the condenser lens which form the movable optical unit of each of the embodiments hereinbefore described. The reflective focusing element is in the embodiment herein shown implemented by a non-spherical concave mirror 110 having an anamorphically curved reflective inner surface. The anamorphically curved reflective inner surface of the concave mirror 110 is non-spherical in the peridional or primary focus plane or in the sagittal or secondary focus plane of the surface. The anamorphic concave mirror 110 is configured so that the radii of curvature in the two orthogonal planes intersecting the reflective inner surface of the mirror 110 are determined to enable the reflected beam of light to be incident on the information carrying surface F of the information storage disk D as shown.

Figure 18:
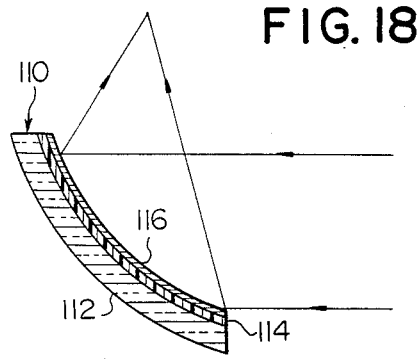
FIG. 18 is a schematic side elevation view showing the detailed construction of a reflective focusing element or concave mirror included in the information record/pickup head assembly illustrated in FIG. 17.

As illustrated in FIG. 18, such an anamorphic concave mirror 110 may be composed of a substrate 112 of typically glass having an anamorphically curved inner concave surface, a plastic coating 114 of a synthetic resin applied to the inner concave surface of the substrate 112, and a reflective film 116 of, for example, aluminum or silver deposited on the plastic coating 114. The plastic coating 114 may be applied to the substrate 112 by forming a layer of an appropriate synthetic resin on the inner concave surface of the substrate 112 to a thickness within a range of 0.1 mm to 0. 3 mm and thereafter finishing the layer of the synthetic resin with use of a replica having a desired anamorphically curved convex surface. If desired, the reflective film 116 may be formed by deposition of gold depending on the wavelength of the semiconductor laser used for the laser generator 56. The entire topography of the reflective inner surface of the mirror 110 provided by the inner surface of the film 116 may be subject to fuctuations due to changes in the ambient temperature but such fluctuations will neither cause any serious problems nor adversely impair the optical performance characteristics of the mirror 110 by reason of the sufficiently small thickness of the intermediate plastic coating 114.

As well known in the art, a reflective focusing element having an anamorphically curved concave reflective inner surface has a focusing distance shorter in one of the two orthogonal planes intersecting the reflective inner surface of the element than in the other of the planes. In the arrangement herein shown, the mirror 110 may thus have a focussing distance shorter in a plane vertically intersecting the mirror 110 than in a plane horizontally intersecting the mirror 110, viz., a plane normal to the surface of the drawing. In this instance, the beam of light reflected from the anamorphically curved concave reflective inner surface of the mirror 110 has a non-circular cross section about the center axis of the beam. To produce a circular spot of light on the information carrying surface F of the information storage disk D, the mirror 110 is for this reason preferably configured so that the reflective inner surface of the mirror 110 has specific radii of curvature in both of the two orthogonal planes intersecting the reflective inner surface of the mirror 110.

Figure 19:
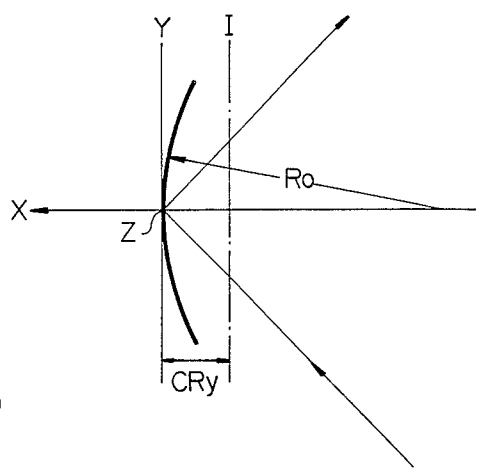
FIG. 19 is a schematic diagram showing the principle of operation of a reflective focusing element of the type which can be used in the information record/pickup head assembly illustrated in FIG. 17.

In the schematic diagram of FIG. 19 is taken into account a three-dimensional orthogonal coordinate system which consists of an X-axis located on a plane parallel with the surface of the drawing, a Y-axis also located on the plane parallel with the surface of the drawing and perpendicular to the X-axis, and a Z-axis perpendicular to the X-axis and Y-axis at the intersecting point of the X- and Y-axes. There is now further taken into account a focusing mirror defined by a torus having a center axis inclined through 45 degrees from an axis I parallel with the Y-axis of such a coordinate system. Assuming that the torus has a canonical radius of curvature $CR_y$ and a radius of curvature Ro at a surface vertex of its cross section in the X-Y plane, a beam of light having a circular cross section operable for reading information from the information carrying surface F of the information storage disk D can be produced when the following relationships are established between the radii of curvature $CR_y$ and Ro:

$$1.9 CR_y < Ro < 2.1 CR_y$$

By way of example, a concave mirror 110 having an anamorphically curved reflective inner surface may be designed so that the radius of curvature $CR_y$ equals 18.6 mm and the radius of curvature Ro equals 9.22 mm. The mirror 110 designed in this fashion will be capable of producing a circular spot of light at a distance of 6.5 mm from the optic-axial point of the mirror. Such a mirror 110 will be more advantageous for the correction of the spherical abberation if the non-spherical reflective inner surface of the mirror 110 is modified with the above defined radii of curvature $CR_y$ and Ro practically unchanged.

If desired, the radii of curvature $CR_y$ and Ro may be given in a ratio within the range of 1 vs 1 to 4 vs 1 or otherwise the mirror 110 may be shaped so that the beam of light reflected therefrom has an elliptical cross section. Furthermore, a concave mirror having any non-spherical reflective inner surface having a 45 -degree shifted center axis may be readily designed such that the distribution of the intensities of light varies asymmetrically along the major axis of the elliptical cross section of the beam of light reflected from the mirror. A mirror of this design will find a most successful application in a rapid-heating, slow-cooling information record/pickup head assembly for use with an erasable information storage disk since the erasure of information from the disk can be performed with an enhanced efficiency.

As will have been understood from the above description, the seventh preferred embodiment of an information record/pickup head assembly according to the present invention is characterized, inter alia, by the use of a single reflective focusing element 120 for forming the movable optical unit of the information record/pickup head assembly. The reflective focusing element 110 has both the function to have the optical axis of an incoming beam of light reflected at an angle of 90 degrees and the function to have the reflected right focussed on a desired plane and is useful for significantly reducing the weight and measurement of the movable optical unit and further for considerably reducing the access time in reading or writing information on an optical information storage disk. Such a reflective focusing elements can be manufactured with use of a replica, which provides ease of manufacture and significant reduction of the production cost. In view, furthermore, of the fact that the stable performance characteristics of the reflective focusing element, an information record/pickup head assembly will operate stably without regard to the fluctuations in the focal distance and spherical abberation.

Figure 20:
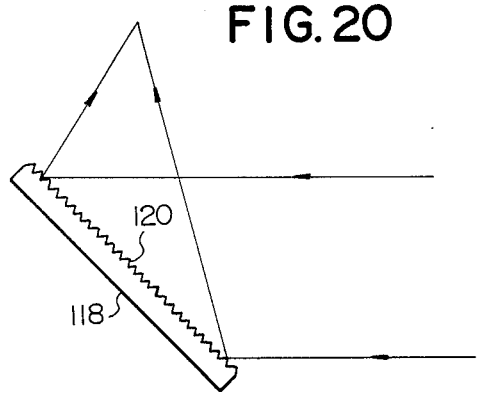
FIG. 20 is a schematic side elevation view showing a modification of the reflective focusing element of the type used in the information record/pickup head assembly illustrated in FIG. 17.

FIG. 20 of the drawings shows a modification of the reflective focusing element implemented by the convex mirror 110 included in the embodiment of the present invention as hereinbefore described with reference to FIGS. 17 to 19. The reflective focusing element, now designated by reference numeral 118, has a reflective hologram surface 120. A reflective focusing element of this type can be easily manufactured with use of a replica and is adapted for production on a large-scale commercial basis.

The seventh preferred embodiment of the present invention as hereinbefore described specifically features its movable optical unit over each of the other preferred embodiments of the present invention. Each of the first to sixth preferred embodiments of the present invention may be modified to include the features of such a movable optical unit of the seventh embodiment.

While various preferred embodiments of an information record/pickup head assembly according to the present invention have hereinbefore described with reference to the drawings, such embodiments are merely for the purpose of illustration of the subject matter of the present invention and, for this reason, are subject to modification and change in various respects.

What is claimed is:

1. An optical information record/pickup head assembly for an optical information recording and/or reproducing apparatus using an optical information storage disk, comprising a stationary optical unit which is fixedly disposed within the information record/pickup head assembly and a movable optical unit which is movable with respect to the information storage disk loaded into said recording and/or reproducing apparatus, wherein said stationary optical unit is operative to emit a beam of light toward said movable optical unit, which then redirects the incident beam toward said information storage disk, while returning to said stationary optical unit the beam of light reflected from the information storage disk, said stationary optical unit comprising:

a beam emitting means operative to emit a beam of light therefrom;

first optical means for collimating the beam of light from the beam emitting means;

light sensitive means responsive to the beam of light reflected from said information storage disk for obtaining focus-state information;

path-of-light shifting means located in conjunction with said beam emitting means, said first optical means and said light along which the establishing a first path of light along which the beam of light from said beam emitting means is to be directed toward said movable optical unit and a second path of light along which the beam of light returned from said movable optical unit is to be directed toward said light sensitive means;

focus control mean responsive to said focus-state information for driving said first optical means for movement along the optical axis of the first optical means, said movable optical unit comprising:

carrier means carrying said movable optical unit thereon and movable with respect to said information storage disk so that the beam of light received from said stationary optical unit is to be directed at a desired location on said information storage disk, and second optical means fixedly mounted on said carrier means for directing toward and converging on said information storage disk the beam of light received from said stationary optical unit and further directing toward the stationary optical unit the beam of light reflected from said information storage disk, said second optical means having a single reflective focusing element which comprises a concave reflector mirror having an anamorphically curved reflective inner surface.

2. An optical information record/pickup head assembly as set forth in claim 1, in which the anamorphically curved reflective inner surface of said concave reflector mirror is nonspherical in one of the sagittal and meridional focus planes of the surface.

3. An optical head for use in an optical disk system, comprising a stationary unit which is fixedly disposed in said system and a movable unit which is movable with respect to an optical disk loaded into said system, wherein said stationary unit emits a beam of light toward said movable unit which directs the received beam toward the optical disk while returning the beam reflected from the optical disk to said stationary unit, said stationary unit comprising:

emitting means for emitting the beam;

collimating means for collimating the beam from said emitting means;

light sensitive means for receiving the beam reflected from the optical disk and for producing focus-state information;

guide means for directing the beam from said emitting means toward said movable unit and for directing the beam from said movable unit toward said light sensitive means, and focusing means responsive to said focus-state information for moving said collimating means along the optical axis, said movable unit comprising:

carrier means being movable with respect to the optical disk so that the beam is directed to a desired location on the optical disk, and only a single reflecting member fixedly mounted on said carrier means for directing the beam received from said stationary unit toward the optical disk and for returning the beam reflected from the optical disk toward the stationary unit.

4. An optical head as set forth in claim 3, wherein said single reflecting member has a plane reflecting surface, and said movable unit further comprise an object lens for converging the beam on the optical disk.

5. An optical head as set forth in claim 3, wherein said single reflecting member converges the beam on the optical disk.

6. An optical head as set forth in claim 5, wherein said single reflecting member comprises a concave mirror having an anamorphically curved reflective surface.

7. An optical head as set forth in claim 6, wherein said anamorphically curved reflective surface is nonspherical in one of the sagittal and meridional focus planes.

8. An optical head as set forth in claim 5, wherein said single reflecting member has a reflective hologram surface.

9. An optical head as set froth in claim 3, wherein said movable is movable straight radially of the optical disk.

10. An optical head as set forth in claim 3, wherein said movable unit is movable in an arc radially of the optical disk, and said stationary unit further comprises a reflective optical member pivotally movable in synchronism with said movable unit for directing the beam toward the movable unit.

11. An optical head as set forth in claim 3, wherein said guide means comprises a beam splitter located between said emitting means and collimating means and a quarter-wave plate located between said beam splitter and collimating means.

12. An optical head as set forth in claim 3, wherein said guide means comprises a beam splitter located so that said collimating means intervenes between said emitting means and beam splitter and a quarter-wave plate located so that said beam splitter intervenes between said collimating means and quarter-wave plate.

13. An optical head as set forth in claim 12, wherein said collimating means comprises a first lens, and said stationary unit further comprises a second lens which is located between said beam splitter and light sensitive means so that the optical axes of said first and second lenses are parallel with each other, said first and second lenses having an equal focal distance and being movable together.

14. An optical head as set forth in claim 3, wherein said light sensitive means produces data information recorded on the optical disk according to the received beam.

15. An optical head as set forth in claim 14, wherein said light sensitive means comprises a four-segment optoelectric transducer element.

16. An optical head as set forth in claim 14, wherein said light sensitive means comprises a four-segment optoelectric transducer element for obtaining the focus-state information and an optoelectric sensor for obtaining the data information.

17. An optical head as set forth in claim 14, wherein said stationary unit further comprises adjusting means for moving said collimating means perpendicularly to the optical axis thereof for tracking.

18. An optical head for use in an optical disk system, comprising a stationary unit which is fixedly disposed in said system and a movable unit which is movable with respect to an optical disk loaded into said system, wherein said stationary unit emits a beam of light toward said movable unit which directs the received beam toward the optical disk while returning the beam reflected from the optical disk to said stationary unit, said stationary unit comprising:
  emitting means for emitting the beam;
  collimating means for collimating the beam from said emitting means;
  light sensitive means for receiving the beam reflected from the optical disk and for producing focus-state information;
  guide means for directing the beam from said emitting means toward said movable unit and for directing the beam from said movable unit toward said light sensitive means, and
  focusing means responsive to said focus-state information for moving said collimating means along the optical axis, said movable unit comprising:
    carrier means being movable in a straight path radially of the optical disk along the path of the beam from said stationary unit so that the beam is directed to a desired location on the optical disk, and
    optical means fixedly mounted on said carrier means for directing the beam received from said stationary unit toward the optical disk and for returning the beam reflected from the optical disk toward the stationary unit.

19. An optical head as set forth in claim 14, wherein said optical means comprises a plane reflecting mirror and an object lens for converging the beam on the optical disk.

20. An optical head as set forth in claim 18, wherein said optical means comprises a single reflecting member for converging the beam on the optical disk.

21. An optical head as set forth in claim 20, wherein said single reflecting member comprises a concave mirror having an anamorphically curved reflective surface.

22. An optical head as set forth in claim 21, wherein said anamorphically curved reflective surface is nonspherical in one of the sagittal and meridional focus planes.

23. An optical head as set forth in claim 20, wherein said single reflecting member has a reflective hologram surface.

* * * * *